United States Patent
Torisaka et al.

(10) Patent No.: US 10,017,656 B2
(45) Date of Patent: Jul. 10, 2018

(54) IMAGE RECORDING METHOD, TREATMENT LIQUID AND INK SET

(71) Applicant: CANON KABUSHIKI KAISHA, Tokyo (JP)

(72) Inventors: Yoshitaka Torisaka, Tokyo (JP); Takashi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/149,354

(22) Filed: May 9, 2016

(65) Prior Publication Data

US 2016/0340535 A1    Nov. 24, 2016

(30) Foreign Application Priority Data

May 18, 2015   (JP) ................................. 2015-101093

(51) Int. Cl.
| | |
|---|---|
| *C09D 11/54* | (2014.01) |
| *B41M 7/00* | (2006.01) |
| *B41M 5/025* | (2006.01) |
| *B41M 5/03* | (2006.01) |
| *B41M 1/06* | (2006.01) |
| *B41M 5/00* | (2006.01) |

(52) U.S. Cl.
CPC ............ *C09D 11/54* (2013.01); *B41M 5/025* (2013.01); *B41M 7/0018* (2013.01); *B41M 1/06* (2013.01); *B41M 5/0017* (2013.01); *B41M 5/0256* (2013.01); *B41M 5/03* (2013.01)

(58) Field of Classification Search
None
See application file for complete search history.

(56) References Cited

U.S. PATENT DOCUMENTS

| | | | |
|---|---|---|---|
| 5,935,732 | A | 8/1999 | Matsumura et al. |
| 7,276,112 | B2 | 10/2007 | Tokuda et al. |
| 7,377,631 | B2 | 5/2008 | Takada et al. |
| 7,402,200 | B2 | 7/2008 | Imai et al. |
| 7,635,182 | B2 | 12/2009 | Hakamada et al. |
| 7,883,199 | B2 | 2/2011 | Hakamada et al. |
| 7,909,448 | B2 | 3/2011 | Iwata et al. |
| 7,947,762 | B2 | 5/2011 | Udagawa et al. |
| 8,016,406 | B2 | 9/2011 | Hakamada et al. |
| 8,217,097 | B2 | 7/2012 | Udagawa et al. |
| 8,324,293 | B2 | 12/2012 | Imai et al. |
| 8,328,323 | B2 | 12/2012 | Haijima |
| 8,362,108 | B2 | 1/2013 | Imai |
| 8,367,750 | B2 | 2/2013 | Moribe et al. |

(Continued)

FOREIGN PATENT DOCUMENTS

| | | |
|---|---|---|
| JP | 2011-189711 A | 9/2011 |
| JP | 2013-018948 A | 1/2013 |

*Primary Examiner* — An Do
*Assistant Examiner* — Renee I Wilson
(74) *Attorney, Agent, or Firm* — Fitzpatrick, Cella, Harper & Scinto

(57) ABSTRACT

An image recording method including the steps of applying an ink containing a pigment to a recording medium and applying a treatment liquid containing an organic acid to the recording medium so as to overlap at least a part of a region to which the ink is applied. The treatment liquid contains at least one organic compound having an anionic group, and an amino group or quaternary ammonium in its molecular structure and having surface-activating capability.

14 Claims, 1 Drawing Sheet

(56) References Cited

U.S. PATENT DOCUMENTS

| | | |
|---|---|---|
| 8,741,984 B2 | 6/2014 | Moribe et al. |
| 9,011,590 B2 | 4/2015 | Arai et al. |
| 2006/0203055 A1* | 9/2006 | Doi ..................... C09D 11/30 347/96 |
| 2007/0097156 A1 | 5/2007 | Udagawa et al. |
| 2008/0152825 A1* | 6/2008 | Mukai ................. B41M 5/0011 427/466 |
| 2011/0227993 A1 | 9/2011 | Haijima |
| 2012/0320121 A1 | 12/2012 | Arai et al. |
| 2013/0088543 A1* | 4/2013 | Tsuji ...................... B41J 2/01 347/21 |
| 2014/0307023 A1 | 10/2014 | Moribe et al. |
| 2016/0075898 A1 | 3/2016 | Imai et al. |
| 2016/0075899 A1 | 3/2016 | Imai et al. |

* cited by examiner

IMAGE RECORDING METHOD, TREATMENT LIQUID AND INK SET

BACKGROUND OF THE INVENTION

Field of the Invention

The present invention relates to an image recording method, in particular, an image recording method adopting a two-liquid printing system, a treatment liquid and an ink set.

Description of the Related Art

In recent years, what is called a two-liquid printing system using another liquid containing no coloring material (hereinafter may be referred to as "treatment liquid" in some cases) than an ink for the purpose of mainly more improving image quality has been proposed from the viewpoints of formation of a high-quality recorded image and high-speed printing. A component increasing the viscosity of a pigment in an ink is generally added into the treatment liquid used in such a two-liquid printing system.

Japanese Patent Application Laid-Open No. 2013-18948 discloses a two-liquid printing system using aggregation reaction caused by the contact of an ink containing a pigment and an anionic resin fine particle with a treatment liquid containing an organic acid.

Such a two-liquid printing system generally has such a feature that an image with little blurring is obtained with high resolution and image density, and drying after printing is rapid, compared with a conventional printing system using only an ink. However, it has been difficult to form a high-quality image in long-term continuous image formation.

Japanese Patent Application Laid-Open No. 2011-189711 discloses a treatment liquid which is capable of forming an image excellent in scratch resistance, dot size stability and conveyability of a recording medium in long-term continuous image formation and is excellent in coatability. This treatment liquid contains at least one acidic compound selected from organic acidic compounds and inorganic acidic compounds and at least one compound selected from nitrogen-containing heterocyclic compounds and organic mercapto compounds.

SUMMARY OF THE INVENTION

According to an embodiment of the present invention, there is provided an image recording method comprising the steps of applying an ink containing a pigment to a recording medium and applying a treatment liquid containing an organic acid to the recording medium so as to overlap at least a part of a region to which the ink is applied, wherein the treatment liquid contains at least one organic compound having an anionic group, and an amino group or quaternary ammonium in its molecular structure and having surface-activating capability (hereinafter also referred to as an organic compound A).

According to another embodiment of the present invention, there is provided a treatment liquid to be used for aggregating a pigment-containing ink which is applied to a recording medium, wherein the treatment liquid contains at least one organic compound having an anionic group, and an amino group or quaternary ammonium in its molecular structure and having surface-activating capability.

According to a further embodiment of the present invention, there is provided an ink set comprising a pigment-containing ink and a treatment liquid to be used for aggregating the pigment-containing ink which is applied to a recording medium, wherein the treatment liquid contains at least one organic compound having an anionic group, and an amino group or quaternary ammonium in its molecular structure and having surface-activating capability.

According to the present invention, there can be provided an image recording method capable of providing a high-quality image in which both image density unevenness and image blurring are suppressed in long-term continuous and high-speed image formation, a treatment liquid and an ink set.

Further features of the present invention will become apparent from the following description of exemplary embodiments with reference to the attached drawings.

DESCRIPTION OF THE EMBODIMENTS

Figure 1:
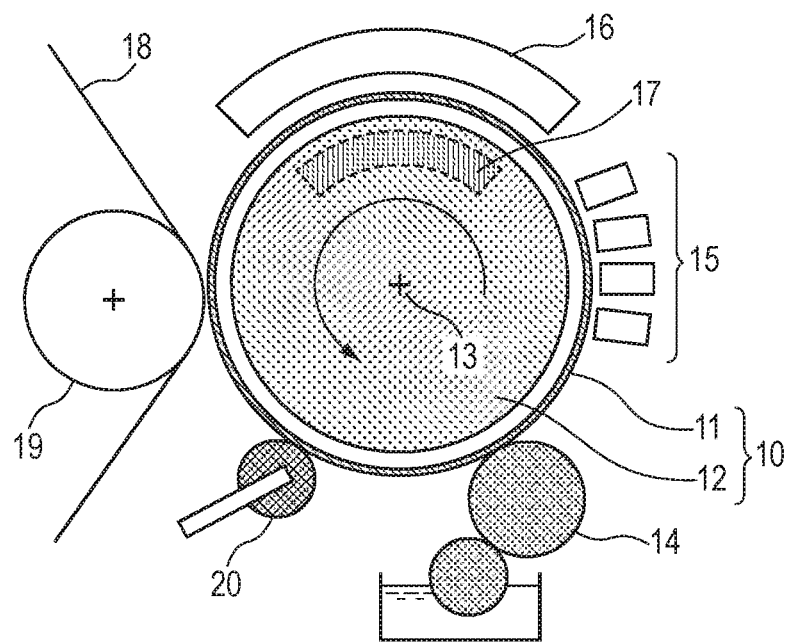
FIG. 1 illustrates an example of an intermediate transfer type image recording apparatus used in the present invention

Preferred embodiments of the present invention will now be described in detail in accordance with the accompanying drawings.

According to an investigation by the present inventors, the use of the treatment liquid disclosed in Japanese Patent Application Laid-Open No. 2011-189711 has not been said to be enough to record a high-quality image in which both image density unevenness and image blurring are suppressed in long-term continuous and high-speed image formation.

Accordingly, it is an object of the present invention to provide an image recording method capable of recording an image in which both image density unevenness and image blurring are suppressed in long-term continuous and high-speed image formation.

The present invention will hereinafter be described in detail by preferred embodiments.

The present inventors have first investigated the cause of the result that a high-quality image in which both image density unevenness and image blurring were suppressed was unable to be recorded in long-term continuous (repeated) and high-speed image formation. As a result, it has been found that metal is eluted by the contact of an organic acid in a treatment liquid with a metal part constituting a coating portion for the treatment liquid. It has also been found that there is thereby a possibility of precipitation of a salt of the organic acid with the metal. It is considered from the above that a high-quality image from which both image density unevenness and image blurring have been inhibited in high-speed printing was unable to be obtained due to reduction of the amount of the organic acid in the treatment liquid and occurrence of troubles of a coating device by the elution of the metal.

Thus, the present inventors have investigated a method for inhibiting the metal elution and reached the constitution of the present invention. Specifically, the present invention provides an image recording method including the steps of applying an ink containing a pigment to a recording medium and applying a treatment liquid containing an organic acid to the recording medium so as to overlap at least a part of a region to which the ink is applied, wherein the treatment liquid contains at least one organic compound A.

Incidentally, a detailed mechanism by which the effect of the present invention is developed is not clearly known, but is presumed to be as follows:

(1) The organic compound A has good solubility in the treatment liquid compared with metal elution inhibiting substances such as a nitrogen-containing heterocyclic compound, e.g. benzotriazole, and an organic mercapto compound which are disclosed in Japanese Patent Application Laid-Open No. 2011-189711. In addition, the organic compound A ionically bonds to the surface of the metal part and is thus considered to be strong in adsorption power on the surface of the metal part compared with a metal elution inhibiting substance such as a nonionic organic compound having surface-activating capability. Therefore, it is considered that the organic compound A is easily adsorbed on the surface of the metal part constituting the coating portion compared with other metal elution inhibiting substances and thus inhibits the metal elution. It is thereby considered that the salt of the organic acid contained in the treatment liquid with the metal is not precipitated; and (2) The organic compound A in the treatment liquid also acts as a component which increased the viscosity of a pigment in an ink and thus more improves aggregability of the ink.

The present inventors presume that a high-quality image in which both image density unevenness and image blurring were suppressed in long-term continuous and high-speed image formation was obtained by virtue of the above reasons (1) and (2).

Treatment Liquid:

The treatment liquid in the present invention contains an organic acid, an organic compound A, a proper amount of water or an organic solvent, a pH adjustor, a surfactant, and so on.

Organic Acid:

The organic acid has an effect to lower the flowability of an ink and/or a part of an ink composition on a recording medium to suppress bleeding or beading upon image formation. That is, the ink application amount per unit area may increase in some cases in image formation using an ink jet device. On such an occasion, bleeding or beading which is blurring or mixing of the ink is liable to occur. However, the flowability of the ink is lowered by the application of the treatment liquid on to the recording medium when an image is formed with the ink, and so the bleeding or beading is hard to occur. As a result, the image is successfully formed and retained.

The content of the organic acid used is within a range of favorably 10% to 99% by mass, more favorably 15% to 90% by mass, most favorably 20% to 80% by mass based on the total mass of the treatment liquid from the viewpoint of formation of a high-quality image. Examples of an organic acid specifically usable as the component which increases the viscosity of the ink include oxalic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, 1,2,3-propanetricarboxylic acid, tartaric acid, lactic acid, pyridonecarboxylic acid, pyronecarboxylic acid, pyrrolcarboxylic acid, furancarboxylic acid, pyridinecarboxylic acid, coumalic acid, thiophenecarboxylic acid, nicotinic acid, hydroxysuccinic acid and dihydroxysuccinic acid. These acids may be used either singly or in any combination thereof.

An acid whose first pKa falls within a range of 0.5 to 4.5 is favorable.

Organic Compound A:

The organic compound A has an anionic group, and an amino group or quaternary ammonium in its molecular structure and also has surface-activating capability. The anionic group means a group exhibiting anionicity in the treatment liquid in the prevent invention. A group forming a salt is also represented as "anionic group" for convenience's sake in the present invention, when the group forming the salt may exist in a state dissociated into an ion in the treatment liquid. Examples of the anionic group include a carboxylic acid group ($—COOM^1$), a sulfonic acid group ($—SO_3M^1$), a phosphonic acid group ($—PO_3HM^1$, $—PO_3M^1{}_2$), $—COO—$, $—SO_3$, $—PO_3{}^{2-}$. $M^1$ is a hydrogen atom, an alkali metal, ammonium or organic ammonium. The carboxylic acid group ($—COOM^1$) or $—COO^-$ is particularly favorable as the anionic group. In addition, the amino group includes $—NH_2$, $—NHR^{10}$, and $—NR^{11}R^{12}$. $R^{10}$, $R^{11}$, and $R^{12}$ are independently an alkyl group, alkenyl group or alkynyl group, an aryl group, a benzyl group or a heterocyclic group.

In addition, the surface-activating capability here means the capability of changing the static surface tension of water (measuring method: Wihelmy method) to 60 mN/m or less when added in an amount of 0.1% by mass into water. The organic compound A inhibits metal elution from the metal part constituting the coating portion for the treatment liquid. Further, the compound contributes to the recording of a high-quality image by improving aggregability of the ink. The amount of the organic compound A contained in the treatment liquid is within a range of favorably 0.1% to 10% by mass, more favorably 0.5% to 7% by mass, most favorably 1% to 5% by mass based on the total mass of the treatment liquid from the viewpoints of inhibition of metal elution and improvement in aggregability of the ink. Examples of a usable organic compound A include carboxybetaine type amphoteric surfactants such as 2-alkyl-N-carboxyalkyl-N-hydroxyalkylimidazolinium betaines represented by the following general formula (1):

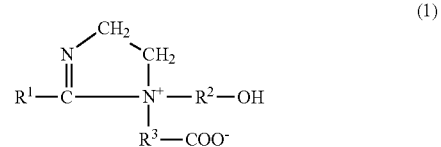

(1)

(In the formula (1), $R^1$ is an alkyl, alkenyl or alkynyl group which has 1 to 20 carbon atoms and may be branched, an aryl group having 6 to 20 carbon atoms, a benzyl group or a heterocyclic group; and $R^2$ and $R^3$ are, independently of each other, an alkylene group having 1 to 3 carbon atoms), such as 2-alkyl-N-carboxymethyl-N-hydroxyethylimidazolinium betaines and 2-alkyl-N-carboxyethyl-N-hydroxyethylimidazolinium betaines; alkali metal salts of β-alkylaminocarboxylic acids represented by the following general formula (2):

(2)

(In the formula (2), $R^4$ is an alkyl, alkenyl or alkynyl group which has 1 to 20 carbon atoms and may be branched, an aryl group having 6 to 20 carbon atoms, a benzyl group or a heterocyclic group; $R^5$ is an alkylene group having 1 to 3 carbon atoms; and M is an alkali metal, examples of the alkali metal represented by M including sodium, potassium and lithium), such as sodium laurylaminoacetate, sodium laurylaminopropionate, potassium laurylaminopropionate, sodium myristylamino-propionate, potassium myristylaminopropionate and triethanolamine laurylaminopropionate; sulfobetaine type amphoteric surfactants such as dodecylaminomethyldimethylsulfopropyl betaine and lauric acid amidopropylhydroxy sulfobetaine; and phosphobetaine type amphoteric surfactants such as laurylhydroxy phosphobetaine. A favorable organic compound A is at least one compound selected from 2-alkyl-N-carboxyalkyl-N-hydroxyalkylimidazolinium betaines represented by the general formula (1) and alkali metal salts of β-alkylaminocarboxylic acids represented by the general formula (2). These organic compounds A may be used either singly or in any combination thereof.

Water and Organic Solvent:

The treatment liquid according to the present invention may also contain proper amounts of water and an organic solvent. For example, water or a mixed solvent of water and a water-soluble organic solvent is mentioned. Specifically, alkanediols such as 1,3-butanediol, 1,5-pentanediol, 1,2-hexanediol and 1,6-hexanediol; glycol ethers such as diethylene glycol monomethyl (or ethyl) ether and triethylene glycol monoethyl (or butyl) ether; alkyl alcohols having 1 to 4 carbon atoms, such as ethanol, isopropanol, n-butanol, isobutanol, sec-butanol and tert-butanol; carboxylic acid amides such as N,N-dimethylformamide and N,N-dimethylacetamide; ketones or keto-alcohols such as acetone, methyl ethyl ketone and 2-methyl-2-hydroxypentan-4-one; cyclic ethers such as tetrahydrofuran and dioxane; glycerol; alkylene glycols such as ethylene glycol, diethylene glycol, triethylene glycol, tetraethylene glycol, 1,2- or 1,3-propylene glycol, 1,2- or 1,4-butylene glycol and polyethylene glycol; polyhydric alcohols such as glycerol, thiodiglycol, 1,2,6-hexanetriol and acetylene glycol derivatives; nitrogen-containing compounds such as 2-pyrrolidone, N-methyl-2-pyrrolidone and 1,3-dimethyl-2-imidazolidinone; and sulfur-containing compounds such as dimethyl sulfoxide are suitably used. Two or more compounds among them may also be selected and mixed for use.

Others:

A neutralizer (pH adjustor) may also be added into the treatment liquid for controlling the hydrogen ion concentration (pH) of the treatment liquid. Specific examples thereof include potassium hydroxide, calcium hydroxide and sodium hydroxide. The pH of the treatment liquid is favorably 0.5 to 5 from the viewpoint of formation of a high-quality image.

In addition, a surfactant may be contained in the treatment liquid for controlling the surface tension of the treatment liquid. Any surfactant may be used as the surfactant so long as it does not have a harmful influence such as lowering of storage stability on the treatment liquid. Examples of a usable surfactant include cationic surfactants such as aliphatic amine salts and quaternary ammonium salts thereof, aromatic quaternary ammonium salts, and heterocyclic quaternary ammonium salts; anionic surfactants such as alkyl carboxylic acid salts, alkyl ether carboxylic acid salts, alkylbenzene sulfonic acid salts, alkylnaphthalane sulfonic acid salts, dialkylsulfosuccinic acid salts, higher alcohol sulfate salts, alkyl ether sulfuric acid salts, alkyl ether phosphate salts and alkyl phosphate salts; nonionic surfactants such as ethers such as alkyl- and alkylallyl-polyoxyethylene ethers, esters such as polyethylene glycol fatty acid esters, and nitrogen-containing compounds such as fatty acid alkanolamides; amphoteric surfactants such as carboxybetaine, aminocarboxylic acid salts and imidazoline derivatives; silicone-based surfactants; and fluorinated surfactants. Specific examples of the silicone-based surfactants include BYK347, BYK348 and BYK349 (all, products of BYK Japan Co.). Specific examples of the fluorinated surfactants include MEGAFAC F-444 (product of DIC Corporation), SURFLON S-242 and S-243 (both, products of AGC SEIMI CHEMICAL CO., LTD.), and Capstone FS-3100 (product of The Chemours Company, LLC). These surfactants may be used either singly or in any combination thereof.

Ink:

The ink used in the image recording method according to the present invention is a pigment ink containing a pigment as an essential component. In general, the ink may also contain various components such as a resin particle, a pigment dispersant such as a water-soluble organic resin, water, an organic solvent, a surfactant and a pH adjustor.

Pigment:

No particular limitation is imposed on the kind of the pigment, and publicly known black pigment and organic pigment may be used. Carbon black is favorably used as the black pigment. In addition, a pigment represented by C.I. (Color Index) Number may be used as the organic pigment. The content (% by mass) of the pigment in the ink is favorably 0.2% to 15.0% by mass, more favorably 0.6% to 10.0% by mass based on the total mass of the ink.

Resin Particle:

The ink used in the image recording method according to the present invention favorably contains a resin particle. The term "resin particle" in the present invention means a resin capable of being present in a solvent in such a dispersed state as to have a particle size. The volume-average particle size (D50) of the resin particle is favorably 10 nm to 1,000 nm, more favorably 40 nm to 500 nm.

Incidentally, the volume-average particle size of the resin particle can be measured by, for example, using, as a measurement sample, a resin particle dispersion such as an ink 50 times diluted (by volume) with pure water and using a particle size distribution meter of a dynamic light scattering system. For example, "UPA-EX150" (trade name, manufactured by NIKKISO CO., LTD.) may be used as the particle size distribution meter of the dynamic light scattering system. In addition, measuring conditions of, for example, Set-Zero: 30 s, number of measurements: 3 times, measuring time: 180 seconds, and refractive index: 1.5 are selected.

The weight-average molecular weight of a resin forming the resin particle in terms of polystyrene as measured by gel permeation chromatography (GPC) is favorably 1,000 to 2,000,000. In addition, the content (% by mass) of the resin particle in the ink is favorably 3% to 20% by mass, more favorably 3% to 15% by mass, particularly favorably 5% to 10% by mass based on the total mass of the ink. The mass ratio of the content (% by mass) of the resin particle to the content (% by mass) of the pigment (resin particle/pigment) based on the total mass of the ink is favorably 0.2 to 100.

Any monomer may be used as a monomer for preparing the resin forming the resin particle so long as it can be used in a polymerization process such as an emulsion polymerization process, a suspension polymerization process or a dispersion polymerization process. The resin is classified as acrylic type, vinyl acetate type, ester type, ethylenic type, urethane type, synthetic rubber type, vinyl chloride type, vinylidene chloride type or olefinic type according to the kind of the monomer. An anionic resin is favorable as the resin forming the resin particle, and an acrylic resin or urethane resin is more favorable.

As examples of a monomer used upon preparation of the acrylic resin, there may be mentioned α,β-unsaturated carboxylic acids such as (meth)acrylic acid, maleic acid, crotonic acid, angelic acid, itaconic acid and fumaric acid, and salts thereof; esterified products of α,β-unsaturated carboxylic acids, such as ethyl (meth)acrylate, methyl (meth)acrylate, butyl (meth)acrylate, methoxyethyl (meth)acrylate, ethoxyethyl (meth)acrylate, diethylene glycol (meth)acrylate, triethylene glycol (meth)acrylate, tetraethylene glycol (meth)acrylate, polyethylene glycol (meth)acrylate, methoxydiethylene glycol (meth)acrylate, methoxytriethylene glycol (meth)acrylate, methoxy-tetraethylene glycol (meth)acrylate, methoxypolyethylene glycol (meth)acrylate, cyclohexyl (meth)acrylate, isobornyl (meth)acrylate, N,N-dimethylaminopropyl (meth)acrylate, monobutyl maleate and dimethyl itaconate; alkylamide compounds of α,β-unsaturated carboxylic acids, such as (meth)acrylamide, dimethyl (meth)acrylamide, N,N-dimethylethyl (meth)acrylamide, N,N-dimethylpropyl (meth)acrylamide, isopropyl (meth)acrylamide, diethyl (meth)acrylamide, (meth)acryloylmorpholine, maleic acid monoamide and crotonic acid methylamide; α,β-ethylenically unsaturated compounds having an aryl group, such as styrene, α-methylstyrene, vinyl phenylacetate, benzyl (meth)acrylate and 2-phenoxyethyl (meth)acrylate; and esterified products of polyfunctional alcohols, such as ethylene glycol diacrylate and polypropylene glycol dimethacrylate.

The acrylic resin may be either a homopolymers or a copolymer. In addition, the copolymer may be either a random copolymer or a block copolymer. A resin synthesized by using a hydrophilic monomer and a hydrophobic monomer is favorable as the acrylic resin. As examples of the hydrophilic monomer, there may be mentioned α,β-unsaturated carboxylic acids and salts thereof. As examples of the hydrophobic monomer, there may be mentioned esterified products of α,β-unsaturated carboxylic acids and α,β-ethylenically unsaturated compounds having an aryl group.

The urethane resin is a resin prepared by reacting a polyisocyanate which is a compound having two or more isocyanate groups with a polyol which is a compound having two or more hydroxyl groups. In the present invention, any of urethane resins obtained by reacting a publicly known polyisocyanate with a publicly known polyol may be used.

As examples of the structure of the resin particle, there may be mentioned a monolayer structure and a multi-layer structure such as a core-shell structure. In the present invention, a resin particle having the multi-layer structure is favorably used, and a resin particle having the core-shell structure is more favorably used. In the resin particle having the core-shell structure, a core portion and a shell portion are clearly functionally separated. The resin particle having such a core-shell structure is favorable because it can give more functions to the resulting ink compared with the resin particle having the monolayer structure.

Pigment Dispersant:

A pigment dispersant for dispersing a pigment in an ink may be contained in the ink. A publicly known pigment dispersant which can be used in an ink jet ink may be used as the pigment dispersant. Among others, a water-soluble resin having both hydrophilic portion and hydrophobic portion at the same time in its structure is favorably used as the pigment dispersant. In particular, a pigment dispersant composed of a water-soluble resin obtained by copolymerizing a hydrophilic monomer and a hydrophobic monomer is favorable. As examples of the hydrophilic monomer, there may be mentioned acrylic acid, methacrylic acid and maleic acid which have a carboxyl group which is an anionic functional group. In addition, as examples of the hydrophobic monomer, there may be mentioned styrene, styrene derivatives, alkyl (meth)acrylates and benzyl (meth)acrylate.

The acid value of the water-soluble resin used as the pigment dispersant is favorably 50 mg KOH/g to 550 mg KOH/g. In addition, the weight-average molecular weight of the water-soluble resin is favorably 1,000 to 50,000.

A mass ratio between the pigment and pigment dispersant (pigment/pigment dispersant) contained in the ink is favorably 1.0:0.1 to 1:3. Incidentally, what is called a self-dispersible pigment obtained by subjecting a pigment itself to surface modification so as to be dispersed in the ink without using the pigment dispersant is also favorably used.

Other Components:

The ink may also contain various additives such as a pH adjustor, a rust preventive, a preservative, a mildewproofing agent, an antioxidant, an antireductant, a neutralizer for the water-soluble resin and a salt as needed.

In addition, a surfactant may be contained in the ink for controlling the surface tension of the ink. Any surfactant may be used as the surfactant so long as it does not have a harmful influence such as lowering of storage stability on the ink. As examples of a usable surfactant, there may be mentioned anionic surfactants such as fatty acid salts, higher alcohol sulfate salts, liquid fatty oil sulfate salts and alkylallylsulfonic acid salts; and nonionic surfactants such as polyoxyethylene alkyl esters, polyoxyethylene sorbitan alkyl esters, acetylene alcohols and acetylene glycols. These surfactants may be used either singly or in any combination thereof.

Image Recording Method:

The image recording method according to the present invention has the steps of ejecting an ink from a recording head of an ink jet system to apply the ink to a recording medium and applying a treatment liquid to the recording medium. The treatment liquid is applied so as to overlap at least a part of a region to which the ink is applied, whereby the ink is brought into contact with the reaction liquid on the recording medium to form an image. In addition, the method may also have a step of heating the recording medium before or after the ink is applied. The method has such a feature that an ink set containing the above-described treatment liquid and ink according to the present invention is used at this time. In the image recording method according to the present invention, the ink may be ejected from a recording head of an ink jet system to apply it to the recording medium. The application of the treatment liquid may be conducted by either a method of ejecting the treatment liquid from the recording head, like the ink, to apply it to the recording medium or a method of applying it by, for example, a roller. Examples of the construction of an apparatus for carrying out the image recording method according to the present invention include an ink jet recording apparatus and such a construction that a coating mechanism is provided in this ink jet recording apparatus, and any publicly known construction may also be adopted. In the present invention, the method of applying the treatment liquid to the recording medium by a roller is favorably used.

In addition, examples of the image recording method according to the present invention include "intermediate transfer type image recording method" and "direct drawing type image recording method".

The intermediate transfer type image recording method is a method in which a recording medium is an intermediate transfer member (hereinafter also referred to as a first recording medium), the ink and the treatment liquid are applied to the intermediate transfer member to form an image, and this image is transferred to another recording medium (hereinafter also referred to as a second recording medium) than the intermediate transfer member, such as paper, thereby recording the image.

The direct drawing type image recording method is a method in which the ink and the treatment liquid are directly applied to a recording medium such as paper to record an image.

The respective image recording methods will now be described.

(1) Intermediate Transfer Type Image Recording Method:

In the intermediate transfer type image recording method, "intermediate transfer member" corresponds to "first recording medium". In addition, a recording medium such as paper, to which an intermediate image is finally transferred, will be described as "second recording medium".

FIG. 1 schematically illustrates an example of an intermediate transfer type image recording apparatus. In FIG. 1, an intermediate transfer member 10 which is the first recording medium includes a support member 12 of a rotatable drum form and a surface layer member 11 arranged on an outer peripheral surface of the support member 12. The intermediate transfer member 10 is rotationally driven in the direction of the arrow (anticlockwise direction in FIG. 1) on a rotational shaft 13. The apparatus is so constructed that respective structures (members) arranged around the intermediate transfer member 10 are operated in synchronization with the rotation of the intermediate transfer member 10. The treatment liquid is applied to the intermediate transfer member 10 by a treatment liquid coating device 14 such as a coating roller. The ink is applied from a recording head 15 of an ink jet system to form an intermediate image mirror-inverted from a desired image on the intermediate transfer member 10. Then, the temperature of the intermediate image formed on the intermediate transfer member may also be controlled by a temperature controlling mechanism 17 so as to be a desired temperature. At this time, a liquid in the intermediate image formed on the intermediate transfer member may also be removed by a liquid removing mechanism 16. The second recording medium 18 is then brought into contact with the intermediate transfer member 10 by means of a pressure roller 19 to transfer the intermediate image to the second recording medium 18. A cleaning unit 20 may also be provided as a unit for cleaning the surface of the intermediate transfer member.

The first recording medium (intermediate transfer member), the second recording medium and respective steps of the intermediate transfer type image recording method will hereinafter be described.

First recording medium (intermediate transfer member):

The intermediate transfer member is a recording medium which holds the treatment liquid and the ink to record the intermediate image. An example of the intermediate transfer member includes one including a support member for handling the intermediate transfer member itself to transmit necessary force and a surface layer member on which the intermediate image is recorded. Incidentally, the support member and the surface layer member may also be formed integrally.

As examples of the shape of the intermediate transfer member, there may be mentioned a sheet-shape, a roller-shape, a drum-shape, a belt-shape and an endless web-shape.

The size of the intermediate transfer member may be suitably set according to the size of a recordable second recording medium.

The support member of the intermediate transfer member is required to have certain strength from the viewpoints of the conveyance accuracy and durability thereof. Metal, ceramic or resin is favorable as a material of the support member. Among these, aluminum, iron, stainless steel, acetal resin, epoxy resin, polyimide, polyethylene, polyethylene terephthalate, nylon, polyurethane, silica ceramic and alumina ceramic are favorable. When the support member is formed by such a material, stiffness capable of withstanding a pressure upon transfer and dimensional accuracy can be secured, and moreover inertia upon operation can be relieved to improve the responsiveness of control. Incidentally, these materials may be used either singly or in any combination thereof.

A surface layer of the intermediate transfer member is required to have certain elasticity because the intermediate image is transferred to the second recording medium such as paper. Supposing that, for example, paper is used as the second recording medium, the surface layer of the intermediate transfer member favorably has a Durometer Type A hardness (according to JIS K 6253) of 10° or more to 100° or less, more favorably 20° or more to 60° or less. Metal, ceramic or resin is favorable as a material of the surface layer member forming the surface layer of the intermediate transfer member. Among these, polybutadiene rubber, nitrile rubber, chloroprene rubber, silicone rubber, fluorinated rubber, fluorosilicone rubber, urethane rubber, styrene elastomer, olefin elastomer, vinyl chloride elastomer, an ester elastomer, an amide elastomer, polyether, polyester, polystyrene, polycarbonate, siloxane compounds and perfluorocarbon compounds are favorable. In addition, the surface layer member may also be formed by laminating a plurality of materials. Examples thereof include a material obtained by laminating silicone rubber on an endless belt-shaped urethane rubber sheet and a material obtained by forming a film of a siloxane compound on a urethane rubber sheet.

In addition, the contact angle of the surface of the intermediate transfer member with water is favorably 50° or more to 110° or less, more favorably 60° or more to 100° or less.

Second Recording Medium:

In the present invention, the second recording medium widely includes not only paper used in general printing, but also fabrics, plastics and films. The second recording medium may also be one cut into a desired size in advance. In addition, a rolled sheet may also be used to cut it into a desired size after recording of an image.

Ink Applying Step:

In an ink applying step, the ink is applied to the intermediate transfer member. An ink jet system is favorably used as a method for applying the ink to the intermediate transfer member. In particular, a system in which thermal energy is applied to the ink to eject the ink from an ejection orifice of a recording head is more favorable.

A line head or a serial head may be used as the recording head of the ink jet system. Incidentally, in the ink jet head of the line head form, ink ejection orifices are arranged in a direction perpendicular to a rotational direction of the intermediate transfer member. (an axial direction in the case where the intermediate transfer member is a drum shape) In addition, the serial head is a head which is scanned in a direction perpendicular to the rotational direction of the intermediate transfer member to conduct recording.

Treatment Liquid Applying Step:

In a treatment liquid applying step, the treatment liquid is applied to the intermediate transfer member. Examples of a method for applying the treatment liquid to the intermediate transfer member include coating systems such as a roller coating method, a bar coating method and a spray coating method, and an ink jet system. In particular, a coating system is favorably used.

In the intermediate transfer type image recording method, the treatment liquid applying step is favorably provided prior to the ink applying step.

The amount of the treatment liquid applied to the intermediate transfer member may be suitably adjusted according to the composition of the ink to react with the treatment liquid. In the present invention, the amount of the treatment liquid applied to the intermediate transfer member is favorably 0.2 $g/m^2$ to 10.0 $g/m^2$, more favorably 0.5 $g/m^2$ to 6.0 $g/m^2$ from the viewpoints of the evenness and fixability of the resulting image. Incidentally, when a region to which the treatment liquid is applied is only a certain part with respect to the size (area: $m^2$) of the intermediate transfer member, the value ($g/m^2$) of the amount of the treatment liquid applied is determined assuming that the treatment liquid is applied to the whole surface of the intermediate transfer member, and it is favorable that this value satisfies the above-mentioned range.

Liquid Removal Step:

A liquid removal step of removing a liquid from the intermediate image formed on the intermediate transfer member may also be provided after the intermediate image is formed by the application of the ink and the treatment liquid and prior to a transfer step. If an excessive liquid is contained in the intermediate image, the image quality of a resulting image may be lowered in some cases because the excessive liquid overflows in a transfer step. Accordingly, the excessive liquid is favorably removed from the intermediate image by the liquid removal step. Examples of a method for removing the liquid include a heating method, a method of sending low-humidity air, a pressure-reducing method, a naturally drying method and a method of combining these methods.

Transfer Step:

In a transfer step, the second recording medium is brought into contact with the intermediate image recorded on the intermediate transfer member to transfer the intermediate image to the second recording medium from the intermediate transfer member which is the first recording medium, thereby recording an image on the second recording medium. When the intermediate image is transferred to the second recording medium, for example, a pressing roller is favorably used to apply a pressure from both sides of the intermediate transfer member and the second recording medium. Transfer efficiency can be improved by the pressing. At this time, the pressure may be applied in multiple stages.

With the strong demand for high-speed recording in recent years as described above, it is required to achieve high transfer efficiency even at a high transfer speed. Accordingly, in the present invention, the transfer speed means a conveying speed of the second recording medium and is favorably 0.4 m/sec or more, more favorably 1.0 m/sec or more, still more favorably 2.0 m/sec or more.

In addition, the intermediate image is favorably heated upon the transfer. Examples of a method for heating the intermediate image include a method of heating the pressing roller to a predetermined transfer temperature and a method of separately providing a heater. The heating temperature of the pressing roller in the transfer step is favorably set according to the resin particle used and is more favorably 25° C. or more to 200° C. or less.

Fixing Step:

A fixing step of pressing the second recording medium to which the intermediate image is transferred by a pressing member such as a roller may also be provided after the transfer step. The smoothness of the image can be improved by the pressing.

In addition, when the second recording medium to which the intermediate image is transferred is pressed by the pressing member, the pressing member is favorably heated. The fastness properties of the resulting image can be improved by pressing the second recording medium by the heated pressing member. Further, the glossiness of the resulting image may also be controlled by controlling the heating temperature.

Cleaning Step:

A cleaning step of cleaning the surface of the intermediate transfer member may also be provided after the transfer step. Any method heretofore used may be used as a method for cleaning the intermediate transfer member. Specific examples thereof include a method of applying a cleaning liquid of a shower form to the intermediate transfer member, a method of bringing a wetted molleton roller into contact with the intermediate transfer member to conduct rubbing-off, a method of bring the intermediate transfer member into contact with the surface of a cleaning liquid, a method of rubbing off the remainder on the intermediate transfer member by a wiper blade, a method of applying various kinds of energy to the intermediate transfer member, and a method of combining some of these methods.

Figure 2:
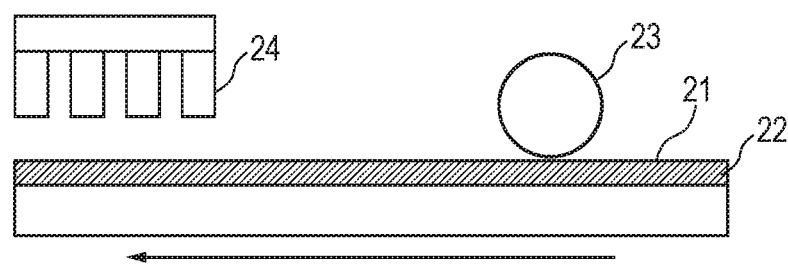
FIG. 2 illustrates an example of a direct drawing type image recording apparatus used in the present invention.

(2) Direct Drawing Type Image Recording Method:

FIG. 2 schematically illustrates an example of a direct drawing type image recording apparatus. In FIG. 2, a recording medium 21 is set on a conveyance stage 22 to convey it in the direction of the arrow. The treatment liquid is applied to the recording medium 21 by a treatment liquid coating device 23 such as a coating roller. Ink is applied from a recording head 24 of an ink jet system to form a desired image. The recording medium and respective steps of the direct drawing type image recording method will hereinafter be described.

Recording Medium:

In the direct drawing type image recording method, the same recording medium as that used as the above-described second recording medium may be used. Specifically, the recording medium widely includes not only paper used in general printing, but also fabrics, plastics and films. The recording medium used in the image recording method according to the present invention may also be one cut into a desired size in advance. In addition, a rolled sheet may also be used to cut it into a desired size after recording of an image.

Ink Applying Step:

In an ink applying step, the ink is applied to the recording medium. An ink jet system is favorably used as a method for applying the ink to the recording medium. In particular, a system in which thermal energy is applied to ink to eject the ink from an ejection orifice of a recording head is more favorable.

A line head or a serial head may be used as a recording head of the ink jet system. Incidentally, in the ink jet head of the line head form, ink ejection orifices are arranged in a direction perpendicular to a conveying direction of the recording medium. In addition, the serial head is a head in which the head is scanned in a direction perpendicular to the conveying direction of the recording medium to conduct recording.

Treatment Liquid Applying Step:

In a treatment liquid applying step, the treatment liquid is applied to a recording medium. Examples of a method for applying the treatment liquid to the recording medium include coating systems such as a roller coating method, a bar coating method and a spray coating method, and an ink jet system. In particular, a coating system is favorably used.

In the direct drawing type image recording method, the treatment liquid applying step is favorably provided prior to the ink applying step.

The amount of the treatment liquid applied to the recording medium may be suitably adjusted according to the composition of the ink to react with the treatment liquid. In the present invention, the amount of the treatment liquid applied to the recording medium is favorably 0.2 $g/m^2$ to 10.0 $g/m^2$, more favorably 0.5 $g/m^2$ to 6.0 $g/m^2$ from the viewpoints of the evenness and fixability of the resulting image. Incidentally, when a region to which the treatment liquid is applied is only a certain with respect to the size (area: $m^2$) of the recording medium, the value ($g/m^2$) of the amount of the treatment liquid applied is determined assuming that the treatment liquid is applied to the whole surface of the recording medium, and it is favorable that this value satisfies the above-mentioned range.

Fixing Step:

A fixing step of pressing the recording medium on which the image is formed by a pressing member such as a roller may also be provided after the ink applying step or the treatment liquid applying step. The smoothness of the image can be improved by the pressurization.

In addition, when the recording medium on which the image is formed is pressed by the pressing member, the pressing member is favorably heated. The fastness properties of the resulting image can be improved by pressing the recording medium by the heated pressing member. Further, the glossiness of the resulting image may also be controlled by controlling the heating temperature.

EXAMPLES

The present invention will hereinafter be described more specifically by Examples and Comparative Examples of the treatment liquid for recording of an image according to the present invention. The present invention is not limited to the following Examples. Incidentally, all designations of "parts(s)" is based on mass unless expressly noted.

Preparation of Treatment Liquid:

Treatment liquids used in the present invention were prepared according to respective compositions shown in Tables 1-1 and 1-2.

TABLE 1-1

| Treatment liquid No. | pH | $pKa_1$ of organic acid | Organic acid | Content (% by mass) | Neutralizer | Content (% by mass) | Org. comp. A*/ other comp. | Content (% by mass) | Surfactant | Content (% by mass) | Water | Content (% by mass) |
|---|---|---|---|---|---|---|---|---|---|---|---|---|
| Treatment liquid 1 | 2 | 2.9 | Citric acid | 30 | KOH | 5 | A-1 | 0.1 | F-444 | 1 | Water | 50 |
| Treatment liquid 2 | 2 | 2.9 | Citric acid | 30 | KOH | 5 | A-1 | 5 | F-444 | 1 | Water | 50 |
| Treatment liquid 3 | 2 | 2.9 | Citric acid | 30 | KOH | 5 | A-1 | 10 | F-444 | 1 | Water | 50 |
| Treatment liquid 4 | 2 | 2.9 | Citric acid | 30 | KOH | 5 | A-2 | 0.1 | F-444 | 1 | Water | 50 |
| Treatment liquid 5 | 2 | 2.9 | Citric acid | 30 | KOH | 5 | A-2 | 5 | F-444 | 1 | Water | 50 |
| Treatment liquid 6 | 2 | 2.9 | Citric acid | 30 | KOH | 5 | A-2 | 10 | F-444 | 1 | Water | 50 |
| Treatment liquid 7 | 2 | 2.9 | Citric acid | 30 | KOH | 5 | A-1/A-2 | 5/5 | F-444 | 1 | Water | 50 |
| Treatment liquid 8 | 1.2 | 2.7 | Malonic acid | 30 | KOH | 1 | A-1 | 5 | F-444 | 1 | Water | 50 |
| Treatment liquid 9 | 3 | 3.2 | Malic acid | 30 | KOH | 5 | A-1 | 5 | F-444 | 1 | Water | 50 |
| Treatment liquid 10 | 4 | 4.1 | Glutaric acid | 30 | KOH | 5 | A-1 | 5 | F-444 | 1 | Water | 50 |
| Treatment liquid 11 | 0.4 | 2.7 | Malonic acid | 30 | KOH | 0 | A-2 | 5 | F-444 | 1 | Water | 50 |
| Treatment liquid 12 | 5.2 | 4.1 | Glutaric acid | 30 | KOH | 10 | A-2 | 5 | F-444 | 1 | Water | 50 |
| Treatment liquid 13 | 1.1 | 0.4 | Pickling acid | 30 | KOH | 10 | A-2 | 5 | F-444 | 1 | Water | 50 |
| Treatment liquid 14 | 4 | 4.6 | Butylic acid | 30 | KOH | 5 | A-2 | 5 | F-444 | 1 | Water | 50 |
| Treatment liquid 15 | 2 | 2.9 | Citric acid | 30 | KOH | 5 | A-1 | 0.05 | F-444 | 1 | Water | 50 |
| Treatment liquid 1 | 2 | 2.9 | Citric acid | 30 | KOH | 5 | A-1 | 15 | F-444 | 1 | Water | 50 |
| Treatment liquid 17 | 2 | 2.9 | Citric acid | 30 | KOH | 5 | A-3 | 0.1 | F-444 | 1 | Water | 50 |
| Treatment liquid 18 | 2 | 2.9 | Citric acid | 30 | KOH | 5 | A-3 | 5 | F-444 | 1 | Water | 50 |

TABLE 1-2

| Treatment liquid No. | pH | pKa₁ of organic acid | Organic acid | Content (% by mass) | Neutralizer | Content (% by mass) | Org. comp. A*/ other comp. | Content (% by mass) | Surfactant | Content (% by mass) | Water | Content (% by mass) |
|---|---|---|---|---|---|---|---|---|---|---|---|---|
| Treatment liquid 19 | 2 | 2.9 | Citric acid | 30 | KOH | 5 | B-1 | 5 | F-444 | 1 | Water | 50 |
| Treatment liquid 20 | 2 | 2.9 | Citric acid | 30 | KOH | 5 | B-2 | 5 | F-444 | 1 | Water | 50 |
| Treatment liquid 21 | 2 | 2.9 | Citric acid | 30 | KOH | 5 | B-3 | 5 | F-444 | 1 | Water | 50 |
| Treatment liquid 22 | 4 | 4.1 | Glutaric acid | 30 | KOH | 5 | B-3 | 5 | F-444 | 1 | Water | 50 |
| Treatment liquid 23 | 2 | 2.9 | Citric acid | 30 | KOH | 5 | B-4 | 5 | F-444 | 1 | Water | 50 |

The abbreviations of the organic compound A and other compounds added to the respective treatment liquids are as follows:

A-1: 2-Coco alkyl-1-carboxymethyl-1-hydroxyethyl-4,5-dihydroimidazolinium hydroxide;
A-2: Sodium laurylaminopropionate;
A-3: Dodecylaminomethyldimethylsulfopropyl betaine;
B-1: Benzotriazole;
B-2: 2-Phenyl-1-mercapto-triazole;
B-3: Thiourea;
B-4: POE (10) acetylene glycol;
Incidentally, all of A-1 to A-3 corresponding to the organic compound A changed the static surface tension of water (measuring method: Wihelmy method) to 60 mN/m or less when added in an amount of 0.1% by mass into water.
F-444: MEGAFAC F-444 (product of DIC Corporation).

Preparation of Black Pigment Dispersion Liquid:

Ten parts of carbon black (trade name: Monarch 1100, product of Cabot Co.), 15 parts of an aqueous resin solution (styrene-ethyl acrylate-acrylic acid terpolymer; acid value: 150 mg KOH/g, weight-average molecular weight: 8,000; aqueous solution having a solid content of 20% by mass; neutralizer: potassium hydroxide) and 75 parts of pure water were mixed. A batch type vertical sand mill (manufactured by IMEX Co.) was charged with the resultant mixture and 200 parts of zirconia beads having a diameter of 0.3 mm to conduct a dispersing treatment for 5 hours while cooling with water. The thus-obtained dispersion liquid was centrifuged by a centrifugal separator to remove coarse particles, thereby obtaining a black pigment dispersion liquid having a pigment concentration of about 10% by mass.

Preparation of Cyan Pigment Dispersion Liquid:

A cyan pigment dispersion liquid having a pigment concentration of about 10% by mass was obtained in the same manner as in the black pigment dispersion liquid except that C.I. Pigment Blue 15:3 was used as the pigment.

Water-Soluble Resin:

A styrene-butyl acrylate-acrylic acid terpolymer (acid value: 121 mg KOH/g, weight-average molecular weight: 7,000; aqueous solution having a solid content of 20% by mass; neutralizer: potassium hydroxide) was used as a water-soluble resin 1.

Preparation of Resin Particle Dispersion:

Eighteen parts of ethyl methacrylate, 2 parts of 2,2'-azobis-(2-methylbutyronitrile) and 2 parts of n-hexadecane were mixed and stirred for 0.5 hours. This mixture was added dropwise to 78 parts of a 6% by mass aqueous solution of a styrene-butyl acrylate-acrylic acid terpolymer (acid value: 130 mg KOH/g, weight-average molecular weight: 7,000), and the resultant mixture was stirred for 0.5 hours. The mixture was then irradiated with ultrasonic waves for 3 hours by an ultrasonic wave irradiation machine. A polymerization reaction was then conducted for 4 hours at 80° C. under a nitrogen atmosphere, and filtration was conducted after cooling at room temperature to prepare a resin particle dispersion 1 having a resin content of 40.0% by mass. The weight-average molecular weight of the resin particle was 250,000, and the average particle size (D50) thereof was 200 nm.

Preparation of Ink:

Inks having respective compositions shown in the following Table 2 were respectively prepared. Specifically, the inks were prepared by mixing respective components shown in Table 2, sufficiently stirring the resultant mixtures and then filtering the mixtures under pressure through a microfilter having a pore size of 3.0 μm (product of Fuji Photo Film Co., Ltd.). Incidentally, the above-described black pigment dispersion liquid was used as the pigment dispersion liquid in black inks 1 and 2, and the above-described cyan pigment dispersion liquid was used as the pigment dispersion liquid in cyan inks 1 and 2.

TABLE 2

| | Pigment dispersion liquid (% by mass) | Water-soluble resin 1 (% by mass) | Resin particle dispersion 1 (% by mass) | Glycerol (% by mass) | Surfactant AE100 (% by mass) | Water (% by mass) |
|---|---|---|---|---|---|---|
| Black ink 1 | 20 | 17 | — | 7 | 1 | Balance |
| Cyan ink 1 | 20 | 17 | — | 7 | 1 | Balance |
| Black ink 2 | 20 | 17 | 25 | 7 | 1 | Balance |
| Cyan ink 2 | 20 | 17 | 25 | 7 | 1 | Balance |

AE100: ACETYLENOL E100 (product of Kawaken Fine Chemicals Co., Ltd.).\

The treatment liquids, pigment inks, recording media, and treatment liquid application methods used in respective Examples and Comparative Examples of the intermediate transfer type image recording method are shown in the following Table 3. In addition, the treatment liquids, pigment inks, recording media, and treatment liquid application methods used in respective Examples and Comparative Examples of the direct drawing type image recording method are shown in the following Table 4.

TABLE 3

|  | Treatment liquid application method | First recording medium | Second recording medium | Ink | Treatment liquid No. |
|---|---|---|---|---|---|
| Ex. 1 | Roller coating | Intermediate transfer member | AUROFA COAT | Cyan ink 2/black ink 2 | Treatment liquid 1 |
| Ex. 2 | Roller coating | Intermediate transfer member | AUROFA COAT | Cyan ink 2/black ink 2 | Treatment liquid 2 |
| Ex. 3 | Roller coating | Intermediate transfer member | AUROFA COAT | Cyan ink 2/black ink 2 | Treatment liquid 3 |
| Ex. 4 | Roller coating | Intermediate transfer member | AUROFA COAT | Cyan ink 2/black ink 2 | Treatment liquid 4 |
| Ex. 5 | Roller coating | Intermediate transfer member | AUROFA COAT | Cyan ink 2/black ink 2 | Treatment liquid 5 |
| Ex. 6 | Roller coating | Intermediate transfer member | AUROFA COAT | Cyan ink 2/black ink 2 | Treatment liquid 6 |
| Ex. 7 | Roller coating | Intermediate transfer member | AUROFA COAT | Cyan ink 2/black ink 2 | Treatment liquid 7 |
| Ex. 8 | Roller coating | Intermediate transfer member | AUROFA COAT | Cyan ink 2/black ink 2 | Treatment liquid 8 |
| Ex. 9 | Roller coating | Intermediate transfer member | AUROFA COAT | Cyan ink 2/black ink 2 | Treatment liquid 9 |
| Ex. 10 | Roller coating | Intermediate transfer member | AUROFA COAT | Cyan ink 2/black ink 2 | Treatment liquid 10 |
| Ex. 11 | Roller coating | Intermediate transfer member | AUROFA COAT | Cyan ink 1/black ink 1 | Treatment liquid 2 |
| Ex. 12 | Roller coating | Intermediate transfer member | AUROFA COAT | Cyan ink 2/black ink 2 | Treatment liquid 11 |
| Ex. 13 | Roller coating | Intermediate transfer member | AUROFA COAT | Cyan ink 2/black ink 2 | Treatment liquid 12 |
| Ex. 14 | Roller coating | Intermediate transfer member | AUROFA COAT | Cyan ink 2/black ink 2 | Treatment liquid 13 |
| Ex. 15 | Roller coating | Intermediate transfer member | AUROFA COAT | Cyan ink 2/black ink 2 | Treatment liquid 14 |
| Ex. 16 | Roller coating | Intermediate transfer member | AUROFA COAT | Cyan ink 2/black ink 2 | Treatment liquid 15 |
| Ex. 17 | Roller coating | Intermediate transfer member | AUROFA COAT | Cyan ink 2/black ink 2 | Treatment liquid 16 |
| Ex. 18 | Head ejection | Intermediate transfer member | AUROFA COAT | Cyan ink 2/black ink 2 | Treatment liquid 2 |
| Ex. 19 | Roller coating | Intermediate transfer member | AUROFA COAT | Cyan ink 2/black ink 2 | Treatment liquid 17 |
| Ex. 20 | Roller coating | Intermediate transfer member | AUROFA COAT | Cyan ink 2/black ink 2 | Treatment liquid 18 |
| Comp. Ex. 1 | Roller coating | Intermediate transfer member | AUROFA COAT | Cyan ink 2/black ink 2 | Treatment liquid 19 |
| Comp. Ex. 2 | Roller coating | Intermediate transfer member | AUROFA COAT | Cyan ink 2/black ink 2 | Treatment liquid 20 |
| Comp. Ex. 3 | Roller coating | Intermediate transfer member | AUROFA COAT | Cyan ink 2/black ink 2 | Treatment liquid 21 |
| Comp. Ex. 4 | Roller coating | Intermediate transfer member | AUROFA COAT | Cyan ink 1/black ink 1 | Treatment liquid 19 |
| Comp. Ex. 5 | Roller coating | Intermediate transfer member | AUROFA COAT | Cyan ink 2/black ink 2 | Treatment liquid 22 |
| Comp. Ex. 6 | Head ejection | Intermediate transfer member | AUROFA COAT | Cyan ink 2/black ink 2 | Treatment liquid 19 |
| Comp. Ex. 7 | Roller coating | Intermediate transfer member | AUROFA COAT | Cyan ink 2/black ink 2 | Treatment liquid 23 |

TABLE 4

|  | Treatment liquid application method | Recording medium | Ink | Treatment liquid No. |
|---|---|---|---|---|
| Ex. 21 | Roller coating | AUROFA COAT | Cyan ink 2/black ink 2 | Treatment liquid 1 |
| Ex. 22 | Roller coating | AUROFA COAT | Cyan ink 2/black ink 2 | Treatment liquid 2 |
| Ex. 23 | Roller coating | AUROFA COAT | Cyan ink 2/black ink 2 | Treatment liquid 3 |
| Ex. 24 | Roller coating | AUROFA COAT | Cyan ink 2/black ink 2 | Treatment liquid 4 |
| Ex. 25 | Roller coating | AUROFA COAT | Cyan ink 2/black ink 2 | Treatment liquid 5 |
| Ex. 26 | Roller coating | AUROFA COAT | Cyan ink 2/black ink 2 | Treatment liquid 6 |
| Ex. 27 | Roller coating | AUROFA COAT | Cyan ink 2/black ink 2 | Treatment liquid 7 |
| Ex. 28 | Roller coating | AUROFA COAT | Cyan ink 2/black ink 2 | Treatment liquid 8 |
| Ex. 29 | Roller coating | AUROFA COAT | Cyan ink 2/black ink 2 | Treatment liquid 9 |
| Ex. 30 | Roller coating | AUROFA COAT | Cyan ink 2/black ink 2 | Treatment liquid 10 |
| Ex. 31 | Roller coating | AUROFA COAT | Cyan ink 1/black ink 1 | Treatment liquid 2 |
| Ex. 32 | Roller coating | AUROFA COAT | Cyan ink 2/black ink 2 | Treatment liquid 11 |
| Ex. 33 | Roller coating | AUROFA COAT | Cyan ink 2/black ink 2 | Treatment liquid 12 |
| Ex. 34 | Roller coating | AUROFA COAT | Cyan ink 2/black ink 2 | Treatment liquid 13 |
| Ex. 35 | Roller coating | AUROFA COAT | Cyan ink 2/black ink 2 | Treatment liquid 14 |
| Ex. 36 | Roller coating | AUROFA COAT | Cyan ink 2/black ink 2 | Treatment liquid 15 |
| Ex. 37 | Roller coating | AUROFA COAT | Cyan ink 2/black ink 2 | Treatment liquid 16 |
| Ex. 38 | Head ejection | AUROFA COAT | Cyan ink 2/black ink 2 | Treatment liquid 2 |
| Ex. 39 | Roller coating | AUROFA COAT | Cyan ink 2/black ink 2 | Treatment liquid 17 |
| Ex. 40 | Roller coating | AUROFA COAT | Cyan ink 2/black ink 2 | Treatment liquid 18 |
| Comp. Ex. 8 | Roller coating | AUROFA COAT | Cyan ink 2/black ink 2 | Treatment liquid 19 |
| Comp. Ex. 9 | Roller coating | AUROFA COAT | Cyan ink 2/black ink 2 | Treatment liquid 20 |
| Comp. Ex. 10 | Roller coating | AUROFA COAT | Cyan ink 2/black ink 2 | Treatment liquid 21 |
| Comp. Ex. 11 | Roller coating | AUROFA COAT | Cyan ink 1/black ink 1 | Treatment liquid 19 |
| Comp. Ex. 12 | Roller coating | AUROFA COAT | Cyan ink 2/black ink 2 | Treatment liquid 22 |
| Comp. Ex. 13 | Head ejection | AUROFA COAT | Cyan ink 2/black ink 2 | Treatment liquid 19 |
| Comp. Ex. 14 | Roller coating | AUROFA COAT | Cyan ink 2/black ink 2 | Treatment liquid 23 |

AURORA COAT: AURORA COAT 127.9 g/m$^2$ (product of Nippon Paper industries Co., Ltd.).

Evaluation:

An image was recorded according to the following method to confirm image density unevenness and image blurring, thereby evaluating the image quality thereof.

Incidentally, in the following image recording apparatus, the conditions in which an ink droplet of 3.0 ng (nanograms) is applied to a unit region of $\frac{1}{1,200}$ in.×$\frac{1}{1,200}$ in. at a resolution of 1,200 dpi×1,200 dpi is defined as a recording duty being 100%.

Image Recording Conditions:

Upon recording of an image, an image was drawn on 1,000 sheets while conveying each recording medium at a conveying speed of 1,000 mm/sec, and the image was left to stand for 24 hours as it is. After an image was then drawn on 1,000 sheets again in the same manner as described above, the following respective evaluations were carried out.

(1) Examples 1 to 20 and Comparative Examples 1 to 7 (Intermediate Transfer Type Image Recording Method)

An intermediate transfer member which is a first recording medium was first provided according to the following method.

The intermediate transfer member was configured to have a two-layer structure formed of a support member and a surface layer member. In this structure, a flat plate formed of an aluminum alloy was used as the support member of the intermediate transfer member from the viewpoint of required characteristics such as stiffness capable of withstanding a pressure upon transfer and dimensional accuracy. A siloxane compound surface layer using a hydrolyzable organic silicon compound as a raw material was formed as the surface layer member of the intermediate transfer member according to the following method. Glycidoxypropyltriethoxysilane and methyltriethoxysilane were mixed at a molar ratio of 1:1, and refluxing under heat was conducted for 24 hours or more by using hydrochloric acid as a catalyst in an aqueous medium to obtain a hydrolyzable condensate solution. The hydrolyzable condensate solution was diluted to 10 to 20% by mass with methyl isobutyl ketone, and a photocationic polymerization initiator (SP150, product of Adeka Corporation) was added in an amount of 5% by mass in terms of solid content to obtain a desired coating solution. The coating solution of the above composition was then used to form a film on the support member by spin coating. As a pretreatment of the support member, a plasma treatment was conducted on the surface thereof to improve its coatability and adhesion to the surface layer. The thus-formed film was then irradiated with light from a UV lamp, exposed and heated for 3 hours at 130° C. to obtain a cured product. The film thickness of the surface layer composed of the cured product at this time was about 0.3 µm.

The treatment liquids and inks obtained above were installed in an intermediate transfer type image recording apparatus (FIG. 1) using the intermediate transfer member obtained above with the combinations shown in Table 3.

Evaluation of Image Density Unevenness:

The intermediate transfer type image recording apparatus was used to first apply the treatment liquid obtained above in an application amount of 0.6 g/m² to the intermediate transfer member which is the first recording medium by means of a coating roller (material: US316) or a recording head of an ink jet system. The cyan ink was then ejected on the intermediate transfer member to which the treatment liquid was applied from the recording head of the ink jet system to form an intermediate image (solid image of 5 cm×cm) whose recording duty was 100%. The intermediate image formed on the intermediate transfer member was then transferred to a second recording medium under a transfer pressure of 5 kg/cm². Incidentally, A4-size coat paper (AURORA COAT; 127.9 g/m², product of Nippon Paper industries Co., Ltd.) was used as the second recording medium. Density unevenness of the solid image formed on the second recording medium was observed through a light microscope. Evaluation results of image density unevenness are shown in Table 5.

Evaluation criterion of image density unevenness:
A: Extremely good no density unevenness;
B: Good to observe no density unevenness;
C: Allowable to observe partial density unevenness;
D: Not allowable to observe density unevenness.

Evaluation of Image Blurring:

The intermediate transfer type image recording apparatus was used to first apply the treatment liquid obtained above in an application amount of 0.6 g/m² to the intermediate transfer member which is the first recording medium by means of the coating roller or the recording head of the ink jet system. The cyan ink was then ejected on the intermediate transfer member to which the treatment liquid was applied from the recording head of the ink jet system to record an intermediate image (solid image of 5 cm×5 cm) whose recording duty was 100%. The black ink was caused to impact on the image drawn area by the cyan ink to form an image for evaluation. Incidentally, the impact time interval between the respective inks in these examples was set to 50 msec. The intermediate image formed on the intermediate transfer member was then transferred to a second recording medium under a transfer pressure of 5 kg/cm². Incidentally, A4-size coat paper (AURORA COAT; 127.9 g/m², product of Nippon Paper industries Co., Ltd.) was used as the second recording medium. Whether blurring was present in the image formed on the second recording medium or not was observed through a light microscope. Evaluation results of image blurring are shown in Table 5.

Evaluation Criterion of Image Blurring:

The image quality of the image was evaluated according to the following criterion by observing whether blurring of a dot having subsequently impacted on the solid image whose duty was 100% was present or not through a light microscope.
A: Extremely good to observe no blurring;
B: Good to observe no blurring;
C: Allowable to observe partial blurring;
D: Not allowable to observe blurring.

(2) Examples 21 to 40 and Comparative Examples 8 to 14 (Direct Drawing Type Image Recording Method)

The treatment liquids and inks obtained above were installed in a direct drawing type image recording apparatus (FIG. 2) with the combinations shown in Table 4.

Evaluation of Image Density Unevenness:

The direct drawing type image recording apparatus was used to first apply the treatment liquid obtained above in an application amount of 1.0 g/m² to A4-size coat paper (AURORA COAT; 127.9 g/m², product of Nippon Paper industries Co., Ltd.) which is a recording medium by means of a coating roller (material: SUS316) or a recording head of an ink jet system. The cyan ink was then ejected on the recording member to which the treatment liquid was applied from the recording head of the ink jet system to form an image (solid image of 5 cm×5 cm) whose recording duty was 100%. Density unevenness of the solid image formed on the recording medium was observed through a light microscope. Evaluation results of image density unevenness are shown in Table 6.

Evaluation criterion of image density unevenness:
A: Extremely good to observe no density unevenness;
B: Good to observe no density unevenness;
C: Allowable to observe partial density unevenness;
D: Not allowable to observe density unevenness.

Evaluation of Image Blurring:

The direct drawing type image recording apparatus was used to first apply the treatment liquid obtained above in an application amount of 1.0 g/m² to A4-size coat paper (AURORA COAT; 127.9 g/m², product of Nippon Paper industries Co., Ltd.) which is a recording medium by means of the coating roller or the recording head of the ink jet system. The cyan ink was then ejected on the recording medium to which the treatment liquid was applied from the recording head of the ink jet system to record an image (solid image of 5 cm×5 cm) whose recording duty was 100%. The black ink was caused to impact on the image drawn area by the cyan ink to form an image for evaluation. Incidentally, the impact time interval between the respective inks in these examples was set to 50 msec. Whether blurring was present in the image formed on the recording medium or not was observed through a light microscope. Evaluation results of image blurring are shown in Table 6.

Evaluation Criterion of Image Blurring:

The image quality of the image was evaluated according to the following criterion by observing whether blurring of a dot having subsequently impacted on the solid image whose duty was 100% was present or not through a light microscope.
A: Extremely good to observe no blurring;
B: Good to observe no blurring;
C: Allowable to observe partial blurring;
D: Not allowable to observe blurring.

TABLE 5

|  | Evaluation result | |
| --- | --- | --- |
|  | Image density unevenness | Image blurring |
| Example 1 | A | A |
| Example 2 | A | A |
| Example 3 | A | A |
| Example 4 | A | A |
| Example 5 | A | A |
| Example 6 | A | A |
| Example 7 | A | A |
| Example 8 | A | A |
| Example 9 | A | A |
| Example 10 | A | A |
| Example 11 | A | A |
| Example 12 | C | B |
| Example 13 | B | C |
| Example 14 | C | B |
| Example 15 | A | C |
| Example 16 | C | C |
| Example 17 | B | C |
| Example 18 | A | A |
| Example 19 | B | C |
| Example 20 | B | C |
| Comp. Example 1 | D | D |
| Comp. Example 2 | D | D |
| Comp. Example 3 | D | D |
| Comp. Example 4 | D | D |
| Comp. Example 5 | D | D |
| Comp. Example 6 | D | D |
| Comp. Example 7 | D | D |

TABLE 6

|  | Evaluation result | |
| --- | --- | --- |
|  | Image density unevenness | Image blurring |
| Example 21 | A | A |
| Example 22 | A | A |
| Example 23 | A | A |
| Example 24 | A | A |
| Example 25 | A | A |
| Example 26 | A | A |
| Example 27 | A | A |
| Example 28 | A | A |
| Example 29 | A | A |
| Example 30 | A | A |
| Example 31 | A | A |
| Example 32 | C | B |
| Example 33 | B | C |
| Example 34 | C | B |
| Example 35 | A | C |
| Example 36 | C | C |
| Example 37 | B | C |
| Example 38 | A | A |
| Example 39 | B | C |
| Example 40 | B | C |
| Comp. Example 8 | D | D |
| Comp. Example 9 | D | D |
| Comp. Example 10 | D | D |
| Comp. Example 11 | D | D |
| Comp. Example 12 | D | D |
| Comp. Example 13 | D | D |
| Comp. Example 14 | D | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-101093, filed May 18, 2015, which is hereby incorporated by reference herein in its entirety.

What is claimed is:

1. An image recording method comprising the steps of:
   applying an ink comprising a pigment to a recording medium; and
   applying a treatment liquid comprising an organic acid and water to the recording medium, so as to overlap at least a part of a region to which the ink is applied,
   wherein the treatment liquid comprises at least one organic compound:
   (a) having (i) an anionic group, and (ii) an amino group or quaternary ammonium in its molecular structure, and
   (b) having a surface-activating capability, wherein the static surface tension of water is changed to 60 mN/m or less when added in an amount of 0.1% by mass into the water.

2. The image recording method according to claim 1, wherein the anionic group of the organic compound is —COO⁻ or —COOM¹, in which M¹ is a hydrogen atom, an alkali metal, ammonium, or organic ammonium.

3. The image recording method according to claim 1, wherein the treatment liquid has a pH of 0.5 to 5.

4. The image recording method according to claim 1, wherein the organic acid has a first pKa of 0.5 to 4.5.

5. The image recording method according to claim 1, wherein a concentration of the organic compound in the treatment liquid is 0.1% to 10% by mass.

6. The image recording method according to claim 1, wherein the organic compound is at least one compound selected from 2-alkyl-N-carboxyalkyl-N-hydroxyalkyl-imidazolinium betaines represented by the following general formula (1) and an alkali metal salt of β-alkylaminocarboxylic acids represented by the following general formula (2):

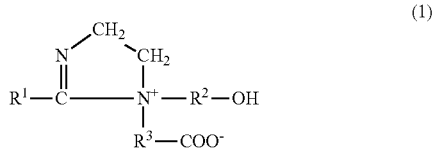
(1)

wherein $R^1$ is an alkyl, alkenyl, or alkynyl group that has 1 to 20 carbon atoms and may be branched, an aryl group having 6 to 20 carbon atoms, a benzyl group, or a heterocyclic group; and $R^2$ and $R^3$ are, independently of each other, an alkylene group having 1 to 3 carbon atoms; and

(2)

wherein $R^4$ is an alkyl, alkenyl, or alkynyl group that has 1 to 20 carbon atoms and may be branched, an aryl group having 6 to 20 carbon atoms, a benzyl group, or a heterocyclic group; $R^5$ is an alkylene group having 1 to 3 carbon atoms; and M is an alkali metal.

7. The image recording method according to claim 1, wherein the ink is applied to the recording medium from a recording head of an ink jet system, and the treatment liquid is applied to the recording medium by a roller.

8. The image recording method according to claim 1, wherein the recording medium is an intermediate transfer member, and an image formed on the intermediate transfer member is transferred to another recording medium than the intermediate transfer member.

9. The image recording method according to claim 1, wherein the amount of the organic compound in the treatment liquid is in a range of 0.1% by mass to 10% by mass.

10. The image recording method according to claim 1, wherein a content of the organic acid is 10% to 99% by mass based on the total mass of the treatment liquid.

11. The image recording method according to claim 1, wherein the organic acid is oxalic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, 1,2,3-propanetricarboxylic acid, tartaric acid, lactic acid, pyridonecarboxylic acid, pyronecarboxylic acid, pyrrolcarboxylic acid, furancarboxylic acid, pyridinecarboxylic acid, coumalic acid, thiophenecarboxylic acid, nicotinic acid, hydroxysuccinic acid, or dihydroxysuccinic acid.

12. The image recording method according to claim 1, wherein the anionic group of the organic compound is $-COO^-$, $-SO_3^-$, $-PO_3^{2-}$, $-COOM^1$, $-SO_3M^1$, $-PO_3HM^1$, or $-PO_3M^1_2$, in which $M^1$ is a hydrogen atom, an alkali metal, ammonium, or organic ammonium.

13. A treatment liquid to be used for aggregating a pigment-containing ink that is applied to a recording medium, the treatment liquid comprising water and at least one organic compound:
(a) having (i) an anionic group, and (ii) an amino group or quaternary ammonium in its molecular structure, and
(b) having a surface-activating capability, wherein the static surface tension of water is changed to 60 mN/m or less when added in an amount of 0.1% by mass into the water.

14. An ink set comprising:
a pigment-containing ink; and
a treatment liquid to be used for aggregating the pigment-containing ink that is applied to a recording medium, wherein the treatment liquid comprises water and at least one organic compound:
(a) having (i) an anionic group, and (ii) an amino group or quaternary ammonium in its molecular structure, and
(b) having a surface-activating capability, wherein the static surface tension of water is changed to 60 mN/m or less when added in an amount of 0.1% by mass into the water.

* * * * *